United States Patent [19]

Study

[11] Patent Number: 5,201,792
[45] Date of Patent: Apr. 13, 1993

[54] ACCUMULATOR FOR VEHICLE AIR CONDITIONING SYSTEM

[75] Inventor: Alan L. Study, Southfield, Mich.

[73] Assignee: Ford Motor Company, Dearborn, Mich.

[21] Appl. No.: 812,717

[22] Filed: Dec. 23, 1991

[51] Int. Cl.⁵ ............................................. F25B 43/00
[52] U.S. Cl. .......................................... 62/503; 55/387; 210/282; 210/DIG. 6
[58] Field of Search ........................... 62/503; 55/387; 210/282, DIG. 6

[56]          References Cited
        U.S. PATENT DOCUMENTS

| | | | |
|---|---|---|---|
| 1,978,463 | 10/1934 | Kettering | 62/115 |
| 3,084,523 | 4/1963 | Bottum et al. | 62/503 |
| 3,092,978 | 6/1963 | Lorentzen | 62/216 |
| 3,438,218 | 4/1969 | O'Neil | 62/503 |
| 3,488,678 | 1/1970 | Wagner | 62/503 |
| 3,563,053 | 2/1971 | Bottum | 62/503 |
| 3,643,466 | 2/1972 | Bottum | 62/503 |
| 3,796,064 | 3/1974 | Ladusaw | 62/503 |
| 3,798,921 | 3/1974 | Scherer et al. | 62/217 |
| 3,837,173 | 9/1974 | Kuttruff et al. | 62/128 |
| 3,837,177 | 9/1974 | Rockwell et al. | 62/503 |
| 3,957,469 | 5/1976 | Nebash | 55/270 |
| 4,111,005 | 9/1978 | Livesay | 62/503 |
| 4,122,579 | 10/1978 | Parise | 15/353 |
| 4,147,479 | 4/1979 | Morse | 417/540 |
| 4,182,136 | 1/1980 | Morse | 62/503 |
| 4,187,695 | 2/1980 | Schumacher | 62/503 |
| 4,199,960 | 4/1980 | Adams et al. | 62/503 |
| 4,236,381 | 12/1980 | Imral et al. | 62/324 R |
| 4,266,408 | 5/1981 | Krause | 62/474 |
| 4,270,934 | 6/1981 | Widdowson et al. | 55/316 |
| 4,276,756 | 7/1981 | Livesay | 62/503 |
| 4,291,548 | 9/1981 | Livesay | 62/503 |
| 4,354,362 | 10/1982 | Schumacher et al. | 62/474 |
| 4,474,035 | 10/1984 | Amin et al. | 62/503 |
| 4,496,378 | 1/1985 | Kish | 55/316 |
| 4,509,340 | 4/1985 | Mullally et al. | 62/503 |
| 4,528,326 | 7/1985 | Avery, Jr. | 62/503 |
| 4,581,903 | 4/1986 | Kerry | 62/503 |
| 4,611,473 | 9/1986 | Wada et al. | 62/503 |
| 4,651,540 | 3/1987 | Morse | 62/503 |
| 4,675,971 | 6/1987 | Masserang | 29/422 |
| 4,730,465 | 3/1988 | Inoue | 62/503 |
| 4,756,166 | 7/1988 | Tomasov | 62/509 |
| 4,768,355 | 9/1988 | Breuhan et al. | 62/503 |
| 4,800,737 | 1/1989 | Smith et al. | 62/503 |
| 4,835,986 | 6/1989 | Carlisle, Jr. | 62/503 |
| 4,994,185 | 2/1991 | Cullen et al. | 62/503 |

Primary Examiner—Ronald C. Capossela
Attorney, Agent, or Firm—Roger L. May; Charles H. Ellerbrock.

[57]                ABSTRACT

An accumulator for use with a vehicle air conditioning system is provided. The accumulator comprises a housing having first and second sections, an outlet tube, and an outlet tube shield. Inlet and outlet openings are formed in the housing through which refrigerant enters and exits the interior chamber defined by the housing. The outlet tube extends to the outlet opening and is preferably integral with the second section. The outlet tube shield is integral with the first section and extends into the interior chamber between the inlet opening and the outlet tube to prevent the direct passage of liquid refrigerant into the outlet tube. A desiccant container is preferably provided in the housing to dry the refrigerant as it circulates through the accumulator.

12 Claims, 3 Drawing Sheets

ACCUMULATOR FOR VEHICLE AIR CONDITIONING SYSTEM

TECHNICAL FIELD

This invention relates to accumulators for air conditioning systems, and more particularly to vehicle air conditioning systems.

BACKGROUND ART

A vehicle air conditioning system conventionally includes a compressor, a condenser, an evaporator, and an accumulator arranged as a refrigerant circuit. The compressor compresses the refrigerant for delivery to the condenser, where the state of the refrigerant changes from gaseous to liquid. The liquid refrigerant then passes to the evaporator, where an air blower circulates air over the evaporator to the vehicle passenger compartment. The resulting heat transfer from the ambient air to the evaporator causes the refrigerant to mostly change state from a liquid back to a gas.

Liquid and gaseous refrigerant then pass from the evaporator to the accumulator. The accumulator separates the liquid refrigerant from the gaseous refrigerant, allowing only gaseous refrigerant to return to the compressor. The residual liquid refrigerant eventually turns to a gaseous state and is then returned to the compressor. The accumulator also provides for recovery of lubricating oil contained in the refrigerant, and for returning a metered amount of the oil to the inlet side of the compressor.

The accumulator normally is an upright cylindrical housing with an inlet opening formed therein and an outlet tube having its mouth in the upper interior region of the accumulator. Refrigerant from the evaporator is introduced into the accumulator through the inlet opening, which may be in the top or in the side of the accumulator housing. The liquid refrigerant settles to the bottom of the accumulator. Gaseous refrigerant rises to the top of the accumulator, where suction created by the compressor draws the gaseous refrigerant through the outlet tube.

To prevent any liquid refrigerant from passing directly from the inlet opening into the mouth of the outlet tube and being drawn back into the compressor, some structure is typically provided to act as an outlet tube shield. The shield is conventionally either a domed or frustoconical shape.

An example of the domed construction appears in U.S. Pat. No. 4,474,035 to Amin et al., assigned to the assignee of the present invention. Amin et al. discloses an accumulator including a domed baffle plate adjacent the accumulator inlet opening. Liquid portions of the refrigerant are disbursed onto the domed baffle plate and down the sides of the accumulator, allowing the gaseous components of the refrigerant to accumulate in the upper regions of the accumulator adjacent the mouth of the outlet tube. The baffle is spot-welded to the inner wall of the accumulator.

Examples of the frustoconical type shield include U.S. Pat. No. 4,270,934 to Widdowson et al. Widdowson et al. discloses an integrally molded baffle that is supported in the interior of the accumulator on the open upper end of the outlet tube, rather than spot welded to the housing of the accumulator. U.S. Pat. No. 4,291,548 to Livesay discloses an accumulator having a baffle of truncated conical shape. The baffle is subassembled with the outlet tube, and then secured as a unit in the accumulator casing at a single joint with an upper casing portion prior to joining with a lower casing portion. U.S. Pat. No. 4,675,971 to Masserang similarly discloses a baffle which is fit onto the upper end of the outlet tube before those components are put into the accumulator.

A problem with the use of domed or frustoconical outlet shields is that they must be separately formed, and then secured within the interior of the accumulator housing. As described, the shield may be secured by spot-welding or some other means, but the requirement of separate parts to complete the accumulator assembly remains. Consequently, complexity of the accumulator and the time necessary to assemble it are relatively great.

SUMMARY OF THE INVENTION

It is an object of the present invention to provide an accumulator comprising a housing, an outlet tube disposed in the housing, and an outlet tube shield integral with the housing.

Another object of the present invention is to provide an accumulator of the type described above which minimizes the number of separate parts required.

Another object of the present invention is to provide an accumulator of the type described above which is less complex than prior art accumulators.

Still another object of the present invention is to provide an accumulator of the type described above which requires less time to assemble.

Yet another object of the present invention is to provide an accumulator of the type described above in which the housing, outlet tube, and outlet tube shield are formed by impact extrusion.

In carrying out the above objects and other objects of the present invention, an accumulator is provided for use in a vehicle air conditioning system. The accumulator comprises a housing, an outlet tube, and an outlet tube shield. The housing includes a first section and a second section which are joined together to define an interior chamber. The housing also has an inlet opening through which refrigerant may be introduced into the interior chamber, and an outlet opening through which refrigerant may exit the interior chamber. Preferably, a desiccant container is disposed in the interior of the housing for drying the refrigerant. The outlet tube is also disposed in the interior chamber of the housing, and extends at least to the outlet opening. The outlet tube shield is integral with the first section and extends into the interior chamber between the inlet opening and the outlet tube to prevent the direct passage of liquid refrigerant into the outlet tube.

The above objects and other objects, features, and advantages of the present invention are readily apparent from the following detailed description of the best mode for carrying out the invention, when taken in connection with the accompanying drawings.

BEST MODE FOR CARRYING OUT THE INVENTION

With reference to the drawings, the preferred embodiments of the present invention will be described.

Figure 1:
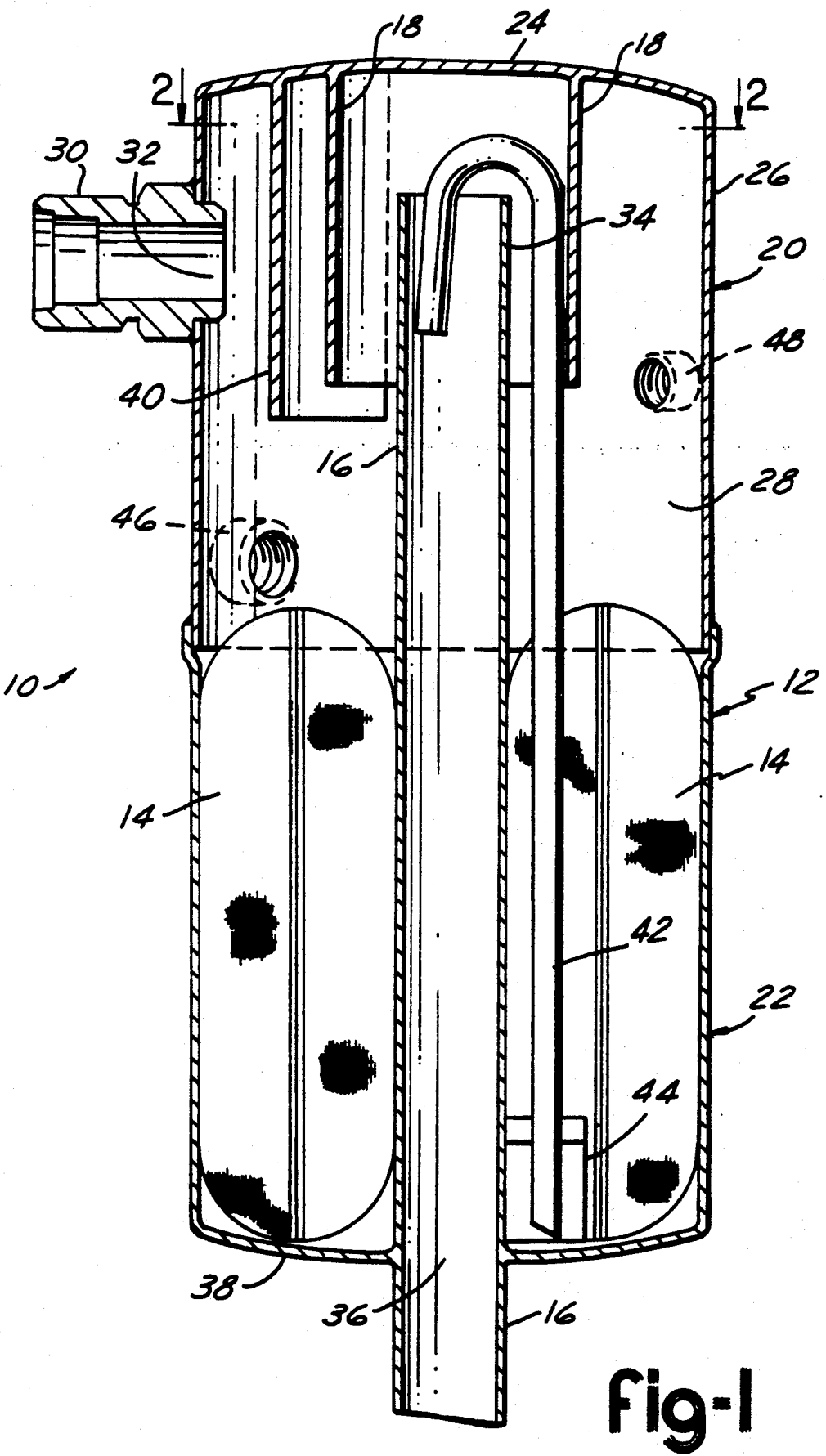
FIG. 1 is a front cross-sectional view of an accumulator according to the present invention.
Figure 2:
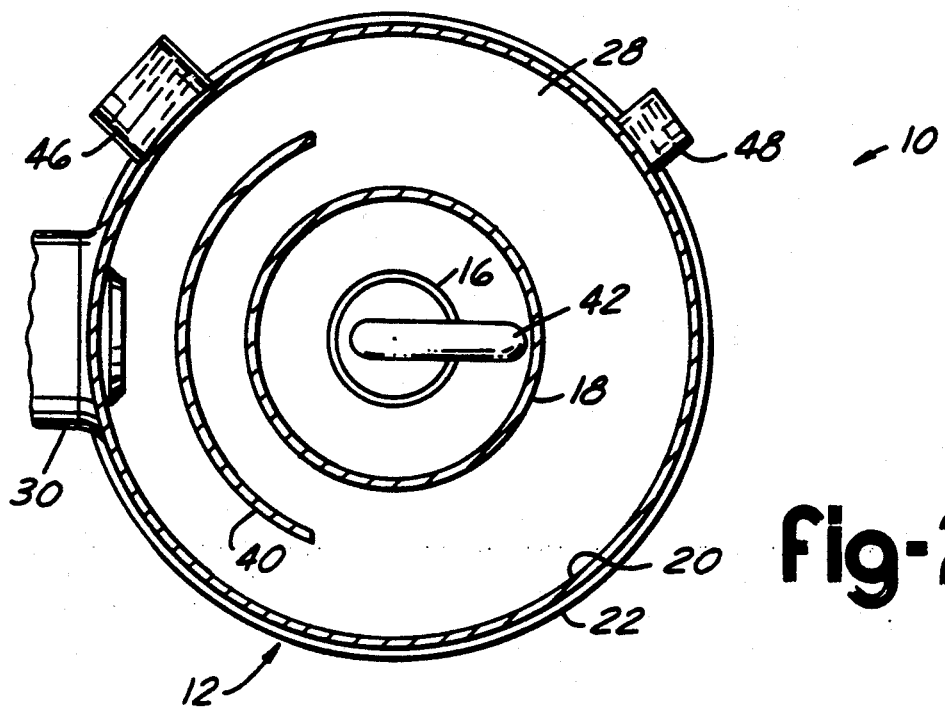
FIG. 2 is a top cross-sectional view of the accumulator taken along line 2—2 in FIG. 1.

FIGS. 1 and 2 show an accumulator 10 for use in a vehicle air conditioning system. The accumulator 10 comprises a housing 12, a desiccant container 14, an outlet tube 16, and an outlet tube shield 18

The housing 12 includes a first or upper section 20 and a second or lower section 22. The first section 20 includes a top or end portion 24, and a generally cylindrical side wall or body portion 26 depending from the end portion 24. The housing sections 20 and 22 are joined together near or above the middle of the housing, preferably by brazing or welding, to define an interior chamber 28. An inlet fitting or tube 30 is welded or otherwise fitted to the housing 12 through an inlet opening 32 formed in the body portion 26 of the first section. Liquid and gaseous refrigerant such as freon circulating from an air conditioning evaporator (not shown) and through the inlet tube 30 is introduced into the interior chamber 28 through the inlet opening 32.

The outlet tube 16 has a free end 34 disposed proximate the end portion 24 of the first section 22. The outlet tube 16 extends from its free end 34 through the interior chamber 28 and exits the housing 12 through an outlet opening 36 formed in a bottom portion 38 of the second section 22. Preferably, the outlet tube 16 is integral with the second section 22.

The desiccant container 14 is disposed in the interior chamber 28 and rests generally on the bottom portion 38 of the second section 22 around the outlet tube 16. The desiccant container 14 holds a desiccant which dries the refrigerant as it circulates through the accumulator 10.

The outlet tube shield 18 is integral with the first section 20. The shield 18 extends into the interior chamber 28 between the inlet opening 32 and the free end 34 of the outlet tube 16. This prevents the relatively high velocity liquid refrigerant introduced through the inlet opening 32 from passing directly into the outlet tube 16. The outlet tube shield 18 preferably extends into the interior chamber 28 from the end portion 24 of the first section 20, substantially parallel to the body portion 26 of the first section 20. As shown in FIG. 2, the outlet tube shield 18 has a generally circular cross-section.

An inlet deflector 40 is also integrally formed with the end portion 24 of the first section 20. The deflector 40 has a semi-circular cross-section, as shown in FIG. 2, so that it is positioned adjacent the inlet opening 32 between the inlet opening 32 and the outlet tube shield 18. The deflector 40 provides an optional structure other than the outlet tube shield 18 against which the incoming flow of refrigerant is directed. Preferably, the deflector 40 depends into the interior chamber 20 a greater distance than the shield 18 to reduce the amount of refrigerant droplets which might otherwise be drawn around the deflector 40 into the outlet tube 16.

The first section 20, including the end portion 24, body portion 26, shield 18, and deflector 40, is formed by impact extruding a charge of material such as aluminum, or molding the first section 20 out of plastic. The second section 22, including the outlet tube 16, is similarly impact extruded.

An oil return quill 42 is disposed in the interior chamber 28 adjacent the outlet tube 16. A filter 44 rests on the bottom 38 of the second section 22. The lubricating oil circulating with the refrigerant mixes with the liquid refrigerant at the bottom of the accumulator 10. Suction from the compressor (not shown) draws the oil and refrigerant mixture through the filter 44, oil return quill 42, and into the outlet tube 16. A supply of oil is thereby metered back to the compressor. Openings in the housing 12 are also provided for a threaded pressure switch port 46 and a threaded service port 48.

The operation of the accumulator 10 will now be described. The incoming flow of refrigerant, such as R12 or R134a, enters the accumulator through the inlet opening 32 and is directed against the deflector 40. Liquid refrigerant and oil then fall or run down the inside of the housing 12 to the bottom of the accumulator where they pool. The vaporous or gaseous refrigerant collects in the upper regions of the interior chamber 28, where it exits through the outlet tube by suction created by the compressor.

Figure 3:
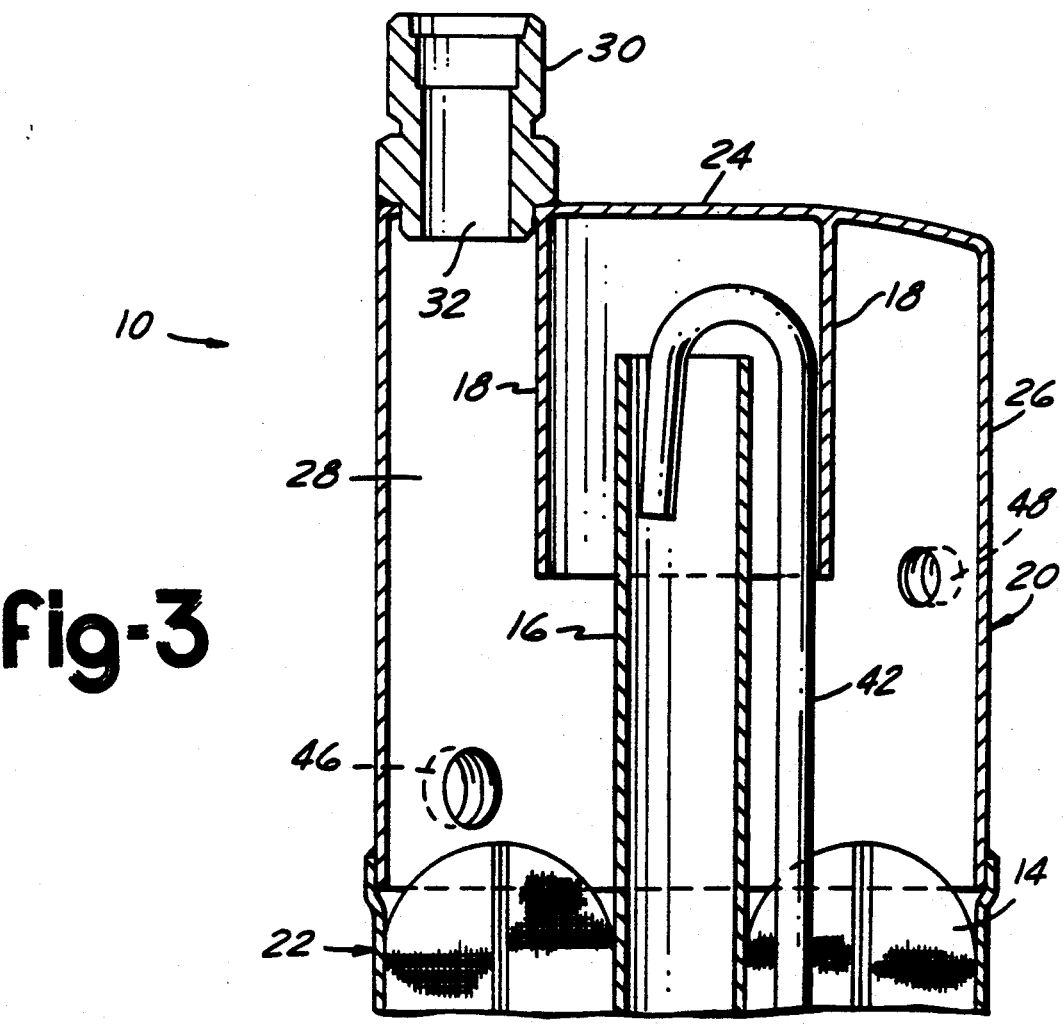
FIG. 3 is a partial front cross-sectional view of a second embodiment of an accumulator according to the present invention.

FIG. 3 shows an alternative embodiment of the accumulator 10 having the inlet opening 32 formed in the end portion 24 of the first section 20. In this embodiment, the incoming flow of refrigerant is directed straight down into the interior chamber 28. The outlet tube shield 18 prevents the direct passage of liquid refrigerant into the outlet tube 16, without the aid of a separate deflector.

Figure 4:
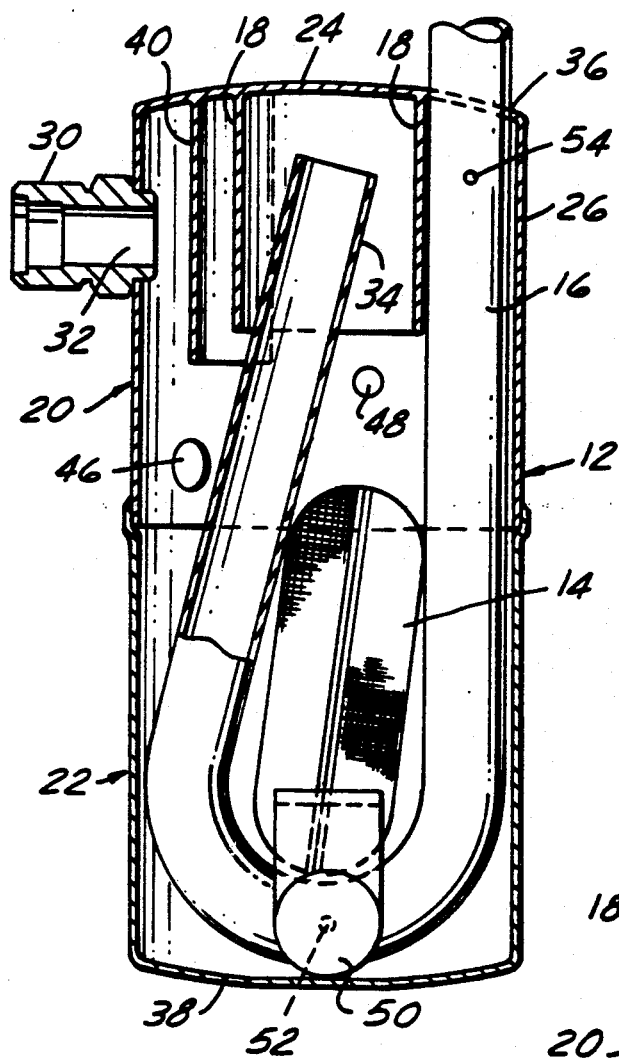
FIG. 4 is a front cross-sectional view of a third embodiment of an accumulator according to the present invention.
Figure 5:
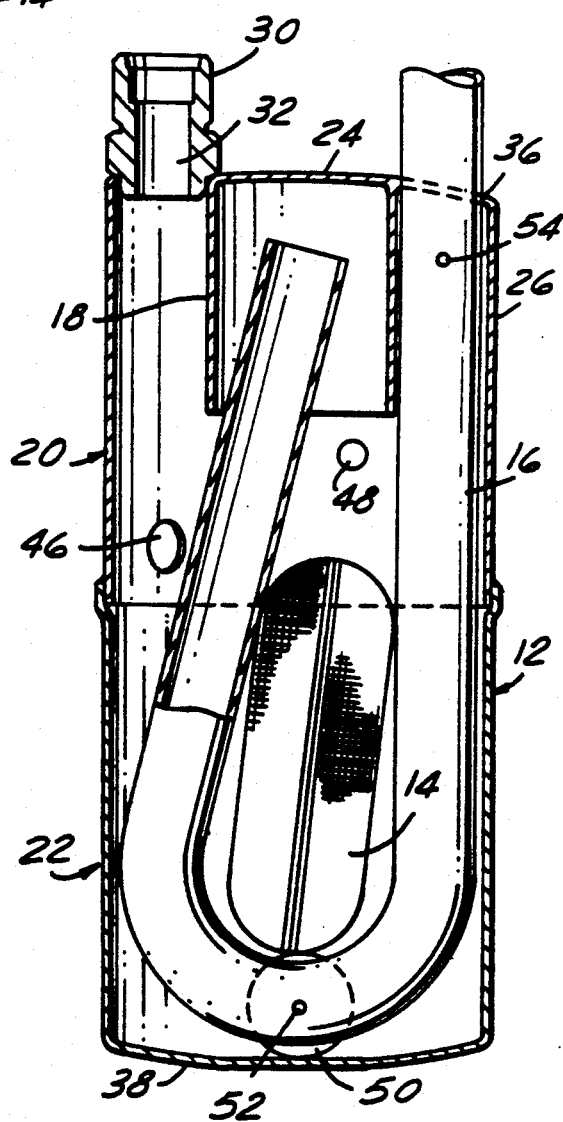
FIG. 5 is a front cross-sectional view of a fourth embodiment of an accumulator according to the present invention.

FIGS. 4 and 5 show further alternative embodiments of the accumulator 10 having the outlet opening 36 formed in the end portion 24 of the first section 20. In both these embodiments, the outlet tube 16 is generally U-shaped, and lubricating oil is metered into the outlet tube 16 through a filter 50 and an oil return orifice 52, as shown and described in U.S. Pat. No. 4,474,035 to Amin et al. A small anti-syphon hole 54 is provided in the outlet tube 16 to prevent undesired syphoning of significant quantities of liquid refrigerant back to the compressor. In FIG. 4, the inlet tube 30 and the inlet opening 32 are positioned to introduce the refrigerant through the body portion 26 and against the deflector 40. In FIG. 5, inlet tube 30 and the inlet opening 32 are located in the end portion 24 of the first section 20.

From the above description and drawings, a method of making an accumulator for use in a vehicle air conditioning system is apparent. The method comprises impact extruding a material such as aluminum to form a first section 20 of a housing, including an outlet tube shield 18. A second section 22 of the housing is then formed by impact extrusion, and inlet and outlet openings 32,36 are formed in the housing. Alternatively, the second section 22 can be replaced by spin closing the open end of the first section 20 having longer side walls. An outlet tube 16 is provided extending into the housing so that the outlet tube shield is disposed between the inlet opening and the outlet tube to prevent the direct passage of liquid refrigerant into the outlet tube. A desiccant container 14 is also provided in the housing, and finally, the first and second sections of the housing are joined together.

While the best mode for carrying out the invention has been described in detail, those familiar with the art will recognize various alternative designs and embodiments for practicing the invention as defined by the following claims.

I claim:

1. An accumulator for use in an air conditioning system, the accumulator comprising:
   a housing including a first section and a second section which together define an interior chamber, the housing having an inlet opening through which refrigerant may be introduced into the interior chamber and an outlet opening through which refrigerant may exit the interior chamber;
   an outlet tube disposed in the interior chamber of the housing and extending at least to the outlet opening;
   an outlet tube shield extending into the interior chamber between the inlet opening and the outlet tube to prevent the direct passage of liquid refrigerant into the outlet tube; and
   a deflector attached to the first section adjacent the inlet opening.

2. The accumulator of claim 1 wherein the deflector is integral with the first section of the housing 3. The accumulator of claim 1 further comprising an oil return quill disposed in the interior chamber of the housing for metering a supply of oil into the outlet tube.

4. The accumulator of claim 1 wherein the first section of the housing includes an end portion and a generally cylindrical body portion attached to the end portion.

5. The accumulator of claim 4 wherein the outlet tube shield extends into the interior chamber from the end portion of the first section.

6. The accumulator of claim 4 wherein the outlet tube shield extends substantially parallel to the body portion of the first section.

7. The accumulator of claim 4 wherein the inlet opening is disposed in the body portion of the first section.

8. The accumulator of claim 4 wherein the inlet opening is disposed in the end portion of the first section.

9. The accumulator of claim 1 wherein the outlet tube shield has a semicircular cross section.

10. The accumulator of claim 1 wherein the inlet opening is located in the first section and the outlet opening is located in the second section.

11. The accumulator of claim 1 wherein the outlet tube is integral with the second section of the housing.

12. An accumulator for use in a vehicle air conditioning system, the accumulator comprising:
    a housing including a first section and a second section which are joined together to define an interior chamber, the housing having an inlet opening through which refrigerant may be introduced into the interior chamber and an outlet opening through which refrigerant may exit the interior chamber;
    a desiccant container disposed in the interior chamber of the housing;
    an outlet tube extending from the outlet opening into the interior chamber;
    an outlet tube shield extending between the inlet opening and the outlet tube to prevent the direct passage of liquid refrigerant into the outlet tube; and
    a deflector attached to the housing adjacent the inlet opening.

* * * * *